US012709034B2

(12) United States Patent
Varghese et al.

(10) Patent No.: US 12,709,034 B2
(45) Date of Patent: Aug. 18, 2026

(54) ELECTRIC SHAVERS

(71) Applicant: KONINKLIJKE PHILIPS N.V., Eindhoven (NL)

(72) Inventors: Babu Varghese, Eindhoven (NL); Jonathan Alambra Palero, Waalre (NL); Gerardus Johannes Nicolaas Doodeman, Veldhoven (NL); Cornelis Gerardus Visser, Eindhoven (NL); Bruno Jean François Frackowiak, The Hague (NL); Peter Johannes Antonius Raedts, Sevenum (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 119 days.

(21) Appl. No.: 18/728,501

(22) PCT Filed: Jan. 6, 2023

(86) PCT No.: PCT/EP2023/050243

§ 371 (c)(1),
(2) Date: Jul. 12, 2024

(87) PCT Pub. No.: WO2023/135065

PCT Pub. Date: Jul. 20, 2023

(65) Prior Publication Data

US 2025/0108528 A1 Apr. 3, 2025

(30) Foreign Application Priority Data

Jan. 14, 2022 (EP) .................................... 22151675

(51) Int. Cl.

*B26B 19/14* (2006.01)
*B26B 19/28* (2006.01)
*B26B 19/38* (2006.01)

(52) U.S. Cl.

CPC ............ *B26B 19/143* (2013.01); *B26B 19/28* (2013.01); *B26B 19/384* (2013.01)

(58) Field of Classification Search

CPC ..... B26B 19/143; B26B 19/28; B26B 19/348; B26B 19/48; B26B 19/46; B26B 21/48;
(Continued)

(56) References Cited

U.S. PATENT DOCUMENTS 5,706,582 A * 1/1998 Hosokawa .............. B26B 19/42 30/34.2
6,098,289 A 8/2000 Wetzel et al.
(Continued)

FOREIGN PATENT DOCUMENTS

EP 2561819 A1 2/2013
EP 3922202 A1 * 12/2021 ............. A61B 5/441
(Continued)

OTHER PUBLICATIONS

International Search report and Written Opinion of PCT/EP2023/050243 dated Apr. 5, 2023.

*Primary Examiner* — Ghassem Alie

(57) ABSTRACT

An electric shaver includes a first hair-cutting unit that includes a first internal cutting member; and a first external cutting member arranged to cover the first internal cutting member, where the first internal cutting member is movable relative to the first external cutting member, where the first external cutting member includes a first skin-contacting area including first hair-entry openings, where the first skin-contacting area is arranged to contact skin during shaving. The electric shaver further includes a second skin-contacting area arranged to contact the skin during shaving, and a bi-polar radio frequency (RF) generator unit configured to apply a first polarity RF voltage to the first external cutting member, where the entirety of the first external cutting member is configured to conduct the first polarity RF
(Continued)

voltage, and where the bi-polar RF generator unit is further configured to apply a second polarity RF voltage to the second skin-contacting area.

17 Claims, 6 Drawing Sheets

(58) Field of Classification Search
CPC ............ B26B 21/4056; A61B 18/1402; A61B 18/082; A61B 2018/1226; A61B 2018/1415; A61B 2018/0054; A61B 2018/00107; A61B 2018/00702; A61N 1/403; A61N 1/328; A61N 1/0476; H05B 6/64; H01J 37/32174
USPC ......... 30/43.6, 34.05, 32, 42, 43.9, 34.1, 50, 30/450
See application file for complete search history.

(56) References Cited

U.S. PATENT DOCUMENTS 8,244,369 B2 * 8/2012 Kreindel ................ A61B 18/14 607/101
8,516,706 B2 8/2013 Flyash et al.
8,516,707 B2 8/2013 Castley et al.
8,700,176 B2 4/2014 Azar et al.
8,806,763 B2 * 8/2014 Shiba ...................... B26B 19/04 30/42
8,838,232 B1 9/2014 Schwerin
10,980,592 B2 4/2021 Horton et al.
2007/0074400 A1 * 4/2007 Steele ................. B26B 19/3846 30/538
2007/0179490 A1 8/2007 Azar
2012/0191085 A1 7/2012 Eckhouse et al.
2012/0233864 A1 * 9/2012 Flyash .................... B26B 21/48 30/34.05
2015/0133906 A1 5/2015 Horton et al.
2018/0126572 A1 * 5/2018 Tomassetti .............. B26B 21/48
2020/0016781 A1 * 1/2020 Tomassetti .............. B26B 21/48

FOREIGN PATENT DOCUMENTS

JP 5934211 B2 * 6/2016 ............. A61N 1/403
JP 2021094920 A 6/2021

* cited by examiner

ELECTRIC SHAVERS

CROSS-REFERENCE TO PRIOR APPLICATIONS

This application is the U.S. National Phase application under 35 U.S.C. § 371 of International Application No. PCT/EP2023/050243, filed on Jan. 6, 2023, which claims the benefit of European Patent Application No. 22151675.0, filed on Jan. 14, 2022. These applications are hereby incorporated by reference herein.

FIELD OF THE INVENTION

This disclosure relates to an electric shaver, and in particular, relates to an electric shaver comprising a radio frequency (RF) generator unit for heating skin, in use.

BACKGROUND OF THE INVENTION

It is generally acknowledged that the application of heat to skin around a certain temperature range, for example, from about 38° C. to 40° C. can evoke a pleasant thermal sensation. Skin warming methods range from applying hot towels, steam, infrared light etc. to skin. Integrating a skin warming unit in a personal care device generally improves the sensorial experience for a user during performance of the personal care routine.

One such personal care device which has employed a skin warming unit are electric shavers. Electric shavers are known which include a heated mechanical element, which can provide warmth to the skin during shaving via the thermal transfer of heat. The warmth produces a pleasant feeling thus improving user experience.

Another method to heat skin is the use of deep dermal heating using radio frequency (RF) energy. The use of the RF energy is different from the heated mechanical elements, which use thermal transfer to provide heating. In RF heating applications, two electrodes are applied to the skin, which each apply oppositely charged RF energy to the skin. This generates an electric field in the skin, between the two electrodes. The RF energy can penetrate deeper into the skin than the thermal transfer due to heated mechanical elements and thus heating can be applied to a relatively large region of the skin. The heating can be applied across the entire depth of penetration without having to rely on thermal conductivity of both the heat applicator and the skin, as is required by the use of heated mechanical elements.

The use of RF energy to heat skin has been incorporated into some shaving devices. U.S. Pat. No. 8,516,706, for example, discloses a blade razor where the blades or separate electrodes adjacent to the blades conduct the RF energy to impart heat to the skin. US 2015/133906 discloses another example where multiple oppositely charged electrodes are included in a shaving cap of an electric shaver. The electrodes are separated by insulating members, which are part of the shaving cap.

SUMMARY OF THE INVENTION

Thus, whilst shaving devices are available that can apply heat to skin using RF energy, the known techniques suffer from drawbacks. For example, it is known that the RF electric field density is inversely proportional to the geometrical size of the conducting electrode and, specifically the size of the part of the electrode that contacts skin. Thus, the use of a pointed blade as an electrode or a similarly dimensioned conductor with a very small skin-contacting area, can generate a high energy RF field. For example, a sharp edge or corner of a blade, which contacts the skin may lead to current concentration generating a high energy RF field in the skin. The high energy RF field can generate hotspots, which result in an unpleasant or even painful heat sensation to the user. In another drawback, the use of multiple small electrodes in the shaving cap of an electric shaver results in a small distance between the electrodes. As such, heating is focussed to small volumes of the skin below the electrodes, thus resulting in only fractional warming of the skin, which does not invoke a strong warming experience. Thus, configuring electrodes of an appropriate dimension into a shaving device to impart warming to skin is challenging, at least in part due to the limited area available for configuring such electrodes into a skin-contacting area of a shaving device.

Therefore, there is a need for an improved shaving device that can use RF energy to impart heat to a user's skin to invoke a pleasant warming sensation.

According to the invention, there is provided an electric shaver that comprises: a first hair-cutting unit comprising: a first internal cutting member; and a first external cutting member arranged to cover the first internal cutting member and wherein the first internal cutting member is movable relative to the first external cutting member; wherein the first external cutting member comprises a first skin-contacting area comprising a first plurality of hair-entry openings, wherein the first skin-contacting area is arranged, in use, to contact skin. The electric shaver further comprises a second skin-contacting area arranged, in use, to contact the skin; and a bi-polar radio frequency, RF, generator unit configured to apply a first polarity RF voltage to the first external cutting member, and wherein the entirety of the first external cutting member is configured to conduct the first polarity RF voltage; and wherein the bi-polar RF generator unit is further configured to apply a second polarity RF voltage to the second skin-contacting area.

In some examples, the electric shaver further comprises a second hair-cutting unit comprising:

- a second internal cutting member; and a second external cutting member arranged to cover the second internal cutting member and wherein the second internal cutting member is movable relative to the second external cutting member; and the second external cutting member comprises the second skin-contacting area and comprises a second plurality of hair-entry openings provided in the second skin-contacting area, and wherein an entirety of the second external cutting member is configured to conduct the second polarity RF voltage. In some examples, the first skin-contacting area is annular shaped, wherein the first internal cutting member is rotatable relative to the first external cutting member; and wherein the second skin-contacting area is annular shaped, wherein the second internal cutting member is rotatable relative to the second external cutting member.

In some examples, the electric shaver further comprises a third hair-cutting unit comprising: a third internal cutting member; a third external cutting member arranged to cover the third internal cutting member and wherein the third internal cutting member is movable relative to the third external cutting member; and wherein the third external cutting member comprises a third skin-contacting area comprising a third plurality of hair-entry openings; and wherein the bi-polar RF generator unit is configured to apply the first polarity voltage to the third external cutting member, and wherein the entirety of the third external cutting member is configured to conduct the first polarity RF voltage.

In some examples, the second hair-cutting unit is arranged between the first hair-cutting unit and the third hair-cutting unit.

In some examples, the first external cutting member and the second external cutting member each comprise a shaving foil extending parallel to a longitudinal direction; and the first internal cutting member and the second internal cutting member are configured to linearly reciprocate parallel to the longitudinal direction relative to the first external cutting member and the second external cutting member, respectively. In some examples, the third external cutting member comprises a shaving foil extending parallel to the longitudinal direction; and the third internal cutting member is configured to linearly reciprocate parallel to the longitudinal direction relative to the third external cutting member.

In some examples, the first skin-contacting area is annular shaped, wherein the first internal cutting member is rotatable relative to the first external cutting member; and the first hair-cutting unit further comprises a first covering element that comprises the second skin-contacting area, and wherein the first covering element is arranged on the first external cutting member in a central position relative to the first skin-contacting area, such that, the first skin-contacting area surrounds the second skin-contacting area, and wherein the first covering element is electrically isolated from the first external cutting member. In some examples, the first covering element may be disc-shaped. In some examples, the entirety of the first covering element may be configured to conduct the second polarity RF voltage.

In some examples, the electric shaver further comprises a second hair-cutting unit, wherein the second hair-cutting unit comprises a second internal cutting member and a second external cutting member arranged to cover the second internal cutting member, and wherein the second internal cutting member is rotatable relative to the second external cutting member; wherein the second external cutting member comprises an annular shaped third skin-contacting area and comprising a second plurality of hair-entry openings, wherein the third skin-contacting area is arranged, in use, to contact skin; wherein the second hair-cutting unit further comprises a second covering element that comprises a fourth skin-contacting area arranged, in use to contact the skin, and wherein the second covering element is arranged on the second external cutting member in a central position relative to the third skin-contacting area such that the third skin-contacting area surrounds the fourth skin-contacting area, wherein the second covering element is electrically isolated from the second external cutting member; and wherein the bi-polar RF generator unit is configured to apply the first polarity RF voltage to the second external cutting member, and wherein the entirety of the second external cutting member is configured to conduct the first polarity RF voltage; and wherein the bi-polar RF generator unit is further configured to apply the second polarity RF voltage to the fourth skin-contacting area. In some examples, the second covering element may be disc-shaped. In some examples, the entirety of the second covering element may be configured to conduct the second polarity RF voltage.

In some examples, the first and second polarity voltages have a frequency in a range from 0.5 MHz to 4 MHz.

In some examples, the first polarity RF voltage and the second polarity RF voltage comprise a peak-to-peak voltage in a range from 10 Volts (V) to 100 V.

These and other aspects will be apparent from and elucidated with reference to the embodiment(s) described hereinafter.

BRIEF DESCRIPTION OF THE DRAWINGS

Exemplary embodiments will now be described, by way of example only, with reference to the following drawings, in which.

DETAILED DESCRIPTION OF THE EMBODIMENTS

Examples according to the present invention thus provide an electric shaver where an external cutting member of a hair-cutting unit is used as a first electrode to transfer RF energy to skin. A covering element for the external cutting member or another external cutting member can be used as a second electrode. As such, since an external cutting member provides a relatively large part of the skin-contacting portion of the electric shaver, a larger surface area is therefore used to deliver RF energy to the skin. Using a larger area as the RF electrode means that a larger area of the skin is subjected to the RF energy, allowing for deeper penetration and thus improved warming. As noted above, warming the skin to about 38° C. to 40° C. can improve the experience for the user. The hair-cutting unit may comprise any suitable design, such as a foil-type hair-cutting unit with a linearly reciprocating cutter or a rotary hair-cutting unit, as further described below.

Figure 1:
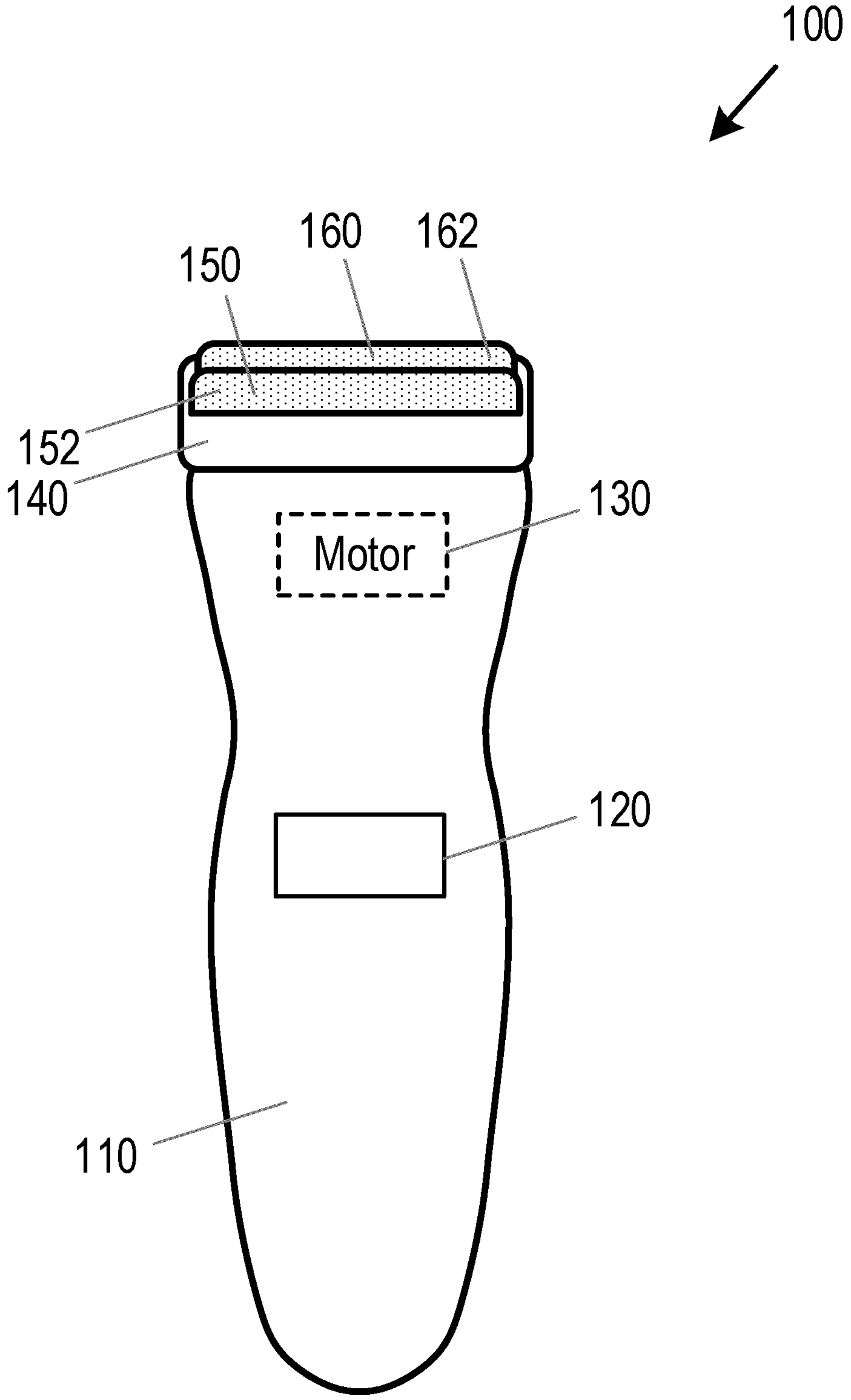
FIG. 1 is an illustration of an exemplary electric shaver in the form of a foil shaver.

FIG. 1 is an illustration of an exemplary electric shaver 100 to which the techniques described herein can be applied. In FIG. 1 the electric shaver 100 is in the form of a foil-type shaver, but it will be appreciated that the techniques described herein can be applied to any type of electric shaver 100, such as a rotary shaver, as described below with reference to FIGS. 4 and 5. The hair-cutting device 100 comprises a main body 110 that is to be held in a hand of a user, and a cutting head 140 in the form of a shaving portion that includes a plurality of hair-cutting units 150, 160 for cutting/shaving hair. In the illustrated example of FIG. 1, the shaving portion comprises a first hair-cutting unit 150 and a second hair-cutting unit 160. Each hair-cutting unit 150, 160 comprises a respective internal cutting member, having a plurality of cutter blades, and a respective external cutting member 152, 162 that comprises a plurality of hair-entry openings. The hair-entry openings may comprise holes and/or slits. Each external cutting member 152, 162 comprises a respective skin-contacting area that contacts the skin of the user when the shaver 100 is in use. The hair-entry openings are part of the skin-contacting area. In the embodiment of FIG. 1, each external cutting member 152, 162 is a shaving foil extending parallel to a longitudinal direction. The external cutting member 152, 162 is arranged to cover the respective internal cutting member and the respective internal cutting member is movable relative to the external cutting member, for example, the plurality of cutter blades may reciprocate linearly parallel to the longitudinal direction relative to the shaving foil. Hairs may penetrate through the openings of the shaving foil 152, 162 and the reciprocating action of the cutter blades cuts the hairs, where the cut ends may collect in a hair collecting area of the shaver 100. The electric shaver 100 thus further comprises motor 130 configured to move the internal cutting members relative to the respective external cutting members 152, 162 to effect the cutting action.

Electric shaver 100 further comprises a bi-polar RF generator unit 120. The bi-polar RF generator unit comprises a bi-polar RF energy source configured to generate bi-polar RF voltages. The RF voltages may comprise a pulse width modulated (PWM) voltage signal with a peak-to-peak voltage in the range of 10 to 100 V, preferably 30-70 V. The PWM voltage signals may comprise a duty cycle in the range of 1-100%, preferably 25-75%. The voltage signals may comprise a frequency in the range of 0.5-4 MHz, preferably 1 MHz. With these parameters for the RF signal, the skin can be warmed to about 38° C. to 40° C., which can improve the experience for the user.

The RF generator unit 120 is configured to apply a first RF voltage to the skin via the skin-contacting area provided by the external cutting member 152, 162 of one of the hair-cutting units 150, 160, for example, the first hair-cutting unit 150. Thus, the RF generator unit 120 is configured to apply the first RF voltage to, for example, the external cutting member 152 of the first hair-cutting unit 150. The external cutting member 152 is formed of an electrically conductive material that is able to conduct the first RF voltage but is also bio-compatible with skin. For example, external cutting member 152 may be formed of a metal, such as stainless steel, silver or silver-chloride. Therefore, the entirety of the external cutting member 152 conducts the first RF voltage. In other words, the external cutting member 152 is used as a first electrode for the RF signal. The RF generator unit 120 is further configured to apply a second RF polarity voltage to another skin-contacting area of the electric shaver 100. In this embodiment, the second RF voltage is applied to the external cutting member 162 in the second hair-cutting unit 160. The external cutting member 162 is also formed of an electrically conductive material that is able to conduct the second RF voltage but is also bio-compatible with skin. Thus external cutting member 162 may be formed of the same or a similar material to external cutting member 152. Therefore, the entirety of the external cutting member 162 conducts the second RF voltage. Thus, the external cutting member 162 of the second hair-cutting unit 160 is used as a second electrode for the RF signal.

Although not shown in FIG. 1, the external cutting members 152, 162 are electrically isolated from each other in the cutting head 140/electric shaver 100 so that a 'circuit' for the RF voltages is only completed when the external cutting members 152, 162 are in contact with the skin. Electrical isolation may be provided by spatially separating the external cutting members 152, 162 from each other, for example by having a distance of at least 2 millimetres (mm) between the external cutting members 152, 162. In addition or alternatively, electrical isolation can be provided by an isolating material located between the external cutting members 152, 162, such as non-conducting plastic.

In use, the application of the cutting head 140 and, in particular, the skin-contacting areas of the external cutting members 152, 162 of the first hair-cutting unit 150 and second hair-cutting unit 160 to skin, allows RF energy to be imparted into the skin to cause heating. As described above, in an RF energy heating procedure, the operation of the RF generator unit 120 and the application of the electrodes creates an electric field in the skin, causing RF energy to flow from one electrode to the other electrode through the skin. Thus, the RF energy from, for example, the external cutting member 152 of the first hair-cutting unit 150 flows to the external cutting member 162 of the second hair-cutting unit 160 via the skin by the application of the external cutting members 152, 162 of the first and second hair-cutting units to the skin, and causes a heating effect in the skin.

Figure 2:
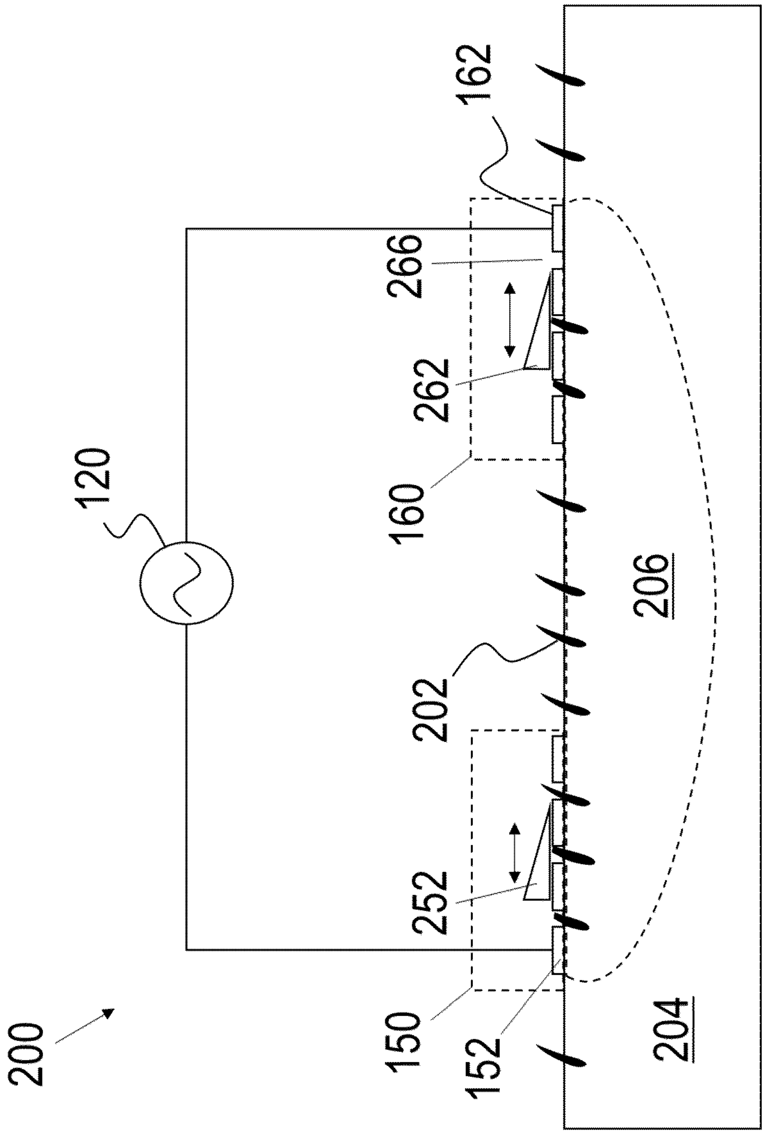
FIG. 2 is a schematic illustration of electric shaver applying RF energy skin to provide warming to the skin.

FIG. 2 illustrates a schematic example of an electric shaving device 200 applying RF energy to skin 204 to provide warming to the skin 204. FIG. 2 schematically illustrates elements present in FIG. 1, where corresponding elements have been given the same reference numeral. FIG. 2 can be considered as a partial cross-section through side of shaver 100 in FIG. 1.

FIG. 2 thus illustrates first hair-cutting unit 150 comprising an internal cutting member 252 and external cutting member 152 (referred to as "first external cutting member" 152). Shaver 100 further comprises second hair-cutting unit 160 that comprises a respective internal cutting member 262 and respective external cutting member 162 (referred to as "second external cutting member" 162). Each external cutting member 152, 162 comprises a respective skin-contacting area that comprises a plurality of hair-entry openings 266, through which hairs 202 on the skin 204 may penetrate. Each internal hair-cutting member 252, 262, is moveable with respect to their respective external cutting members 152, 162, such that movement of the internal hair-cutting member 252, 262 relative to the respective external cutting member 152, 162 cuts the hairs 202 that penetrate through the openings 266.

Shaver 200 further comprises RF energy source 120 configured to apply a first polarity RF voltage, for example, a positive RF voltage, to the first external cutting member 152 and a second polarity RF voltage, for example, a negative RF voltage, to the second external cutting member 162. As such, in use, the first external cutting member 152 and the second external cutting member 162 act as electrodes conducting the RF voltages, to apply RF energy to the skin 204 to which the shaver is applied. The RF energy flows from, for example, the second external cutting member 162 to the first external cutting member 152, to generate a warming region 206 in the skin 204. The entirety of the first external cutting member 152 and the entirety of the second external cutting member 162 may conduct the respective RF voltages, and thus a relatively large area may be used to transfer the RF energy into the skin 204. As such, warming region 206 may be relatively large and induce a pleasant warming sensation across a relatively large area of the skin 204.

As illustrated in FIG. 2, the first and second external cutting members 152, 162 are electrically isolated from one another, such that skin contact is required for the RF energy to flow between the external cutting members 152, 162 and through the skin 204 to generate the warming region 206. In some examples, the first and second external cutting members 152, 162 are at least 2 mm apart to achieve the electrical isolation when not in contact with skin 204. In some examples, the first and second external cutting members 152, 162 as well as the first and second hair-cutting units 150, 160 may be electrically isolated from each other due the presence of an insulating material between the first and second hair-cutting units 150, 160, for example, a plastic material.

Figure 3A:
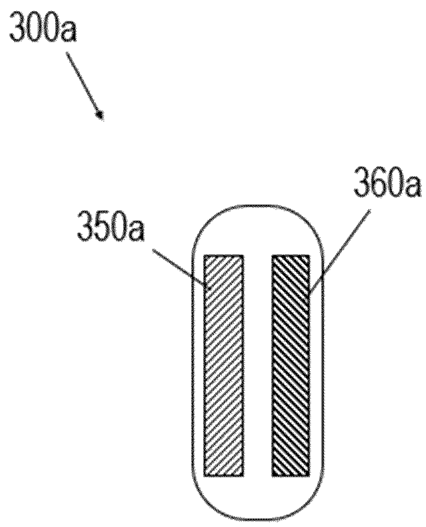
FIGS. 3A and 3B are illustrations of shaving foil arrangements on electric shavers.
Figure 3B:
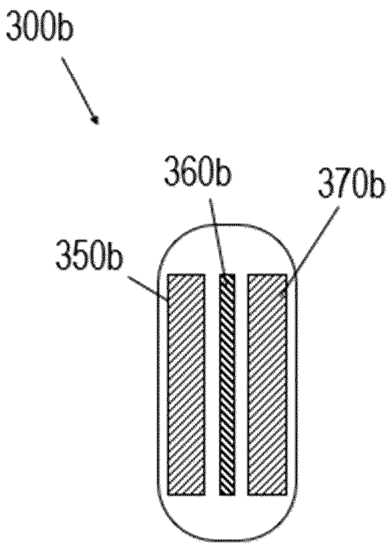

FIGS. 3A and 3B illustrate different hair-cutting unit/shaving foil arrangements on electric shavers 300*a*, 300*b*. FIG. 3A illustrates a shaver 300*a* comprising a first hair-cutting unit having an external cutting member in the form of first shaving foil 350*a* and a second hair-cutting unit having an external cutting member in the form of second shaving foil 360*a*. As similarly described above with respect to FIGS. 1 and 2, an entirety of the first shaving foil 350*a* may conduct a first polarity RF voltage, and an entirety of the second shaving foil 360*a* may conduct a second polarity RF voltage. When not in contact with skin, the two shaving foils 350*a*, 360*a*, are electrically isolated from one another. As such, contact of the shaving foils 350*a*, 360*a* of the shaver 300*a* to skin will cause RF energy to flow from, for example, the first shaving foil 350*a* to the second shaving foil 360*a* through the skin to generate a pleasant warming sensation across a region of the skin.

FIG. 3B illustrates another shaver 300*b* comprising first and second hair-cutting units having respective first and second shaving foils 350*b*, 360*b* as their external cutting members, and further comprising a third hair-cutting unit having an external cutting member in the form of third shaving foil 370*b*. Similarly to shaver 300*a*, the entirety of the first shaving foil 350*b* is configured to conduct a first polarity RF voltage and the entirety of the second shaving foil 360*b* is configured to conduct a second polarity RF voltage. The entirety of the third shaving foil 370*b* is also configured to conduct the first polarity RF voltage. The hair-cutting units are arranged in the shaver 300*b* such that the shaving foils 350*b*, 360*b* and 370*b* are parallel to each other, and the first shaving foil 350*b* and the third shaving foil 370*b* are on opposite sides of the second shaving foil 360*b*. When not in contact with skin, the three shaving foils 350*b*-370*b*, are electrically isolated from one another. As such, when electric shaver 300*b* is applied to skin, RF energy flows, for example, from first and third shaving foils 350*b*, 370*b* to the second shaving foil 360*b* to generate a pleasant warming sensation across a region of the skin. The increased number of shaving foils of the shaver 300*b* compared to the shaver 300*a* may result in a larger area of the skin being warmed.

Figure 4:
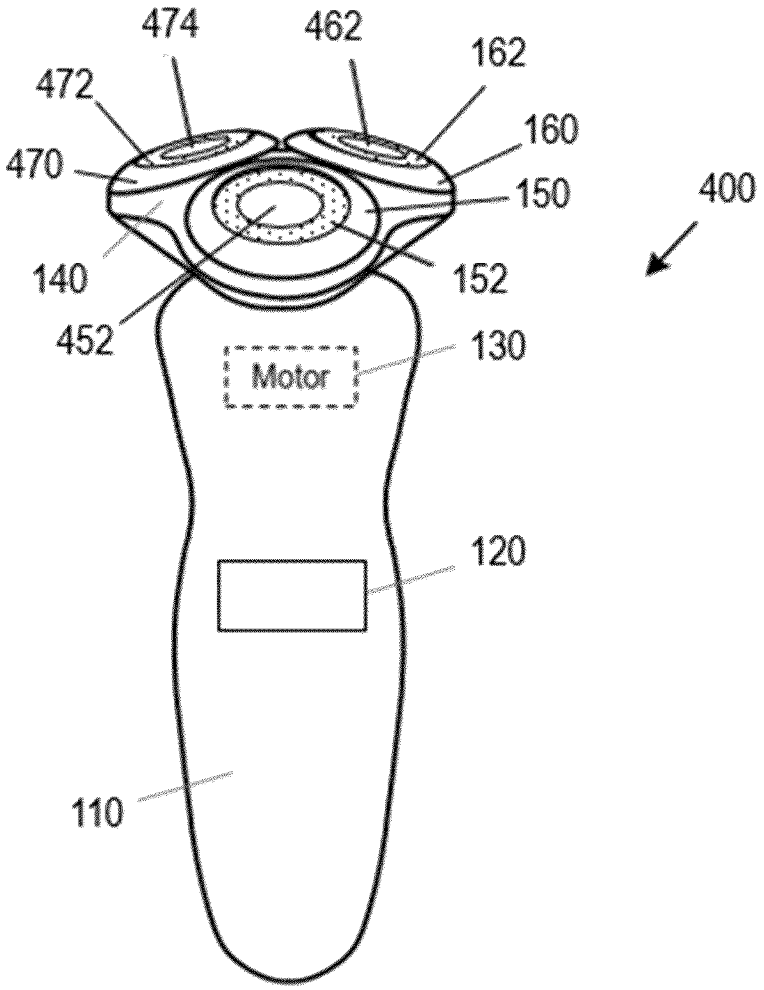
FIG. 4 is another illustration of an exemplary electric shaver in the form of a rotary shaver.

FIG. 4 is an illustration of another exemplary electric shaver 400 to which the techniques described herein can be applied. FIG. 4 illustrates elements present in FIG. 1, where corresponding elements have been given the same reference numeral and are not described in detail below, for brevity.

Electric shaver 400 is thus in the form of a rotary shaver and comprises cutting head 140 comprising a first hair-cutting unit 150 comprising a first external cutting member 152, a second hair-cutting unit 160 comprising a second external cutting member 162, and third hair-cutting unit 470 comprising a third external cutting member 472. The first, second and third hair-cutting units 150, 160, 470 may be mounted in cutting head 140 at suitable mounting positions. In this illustrated embodiment, the hair-cutting units 150, 160, 470 have a triangular arrangement, but it will be appreciated that the hair-cutting units can alternatively be arranged in a line. The external cutting members 152, 162, 472 of the hair-cutting units each comprise a skin-contacting area comprising a plurality of hair-entry openings, which are arranged, in use, to contact skin. The respective skin-contacting areas of the first, second and third hair external cutting members 152, 162, 472, are annular shaped (i.e. ring shaped). Each of the first, second and third hair-cutting units 150, 160, 470 further comprises a respective internal cutting member, in particular having a plurality of cutter blades, that is rotatable relative to its respective external cutting member 152, 162, 472. The external cutting members 152, 162, 472 are each arranged to cover their respective internal cutting member. The hair-entry openings may comprise holes and/or slits. In use, hairs may thus penetrate through the hair-entry openings and rotation of the cutter blades relative to the external cutting members 152, 162, 472 cuts the hairs penetrating through the openings.

First hair-cutting unit 150, second hair-cutting unit 160 and third hair-cutting unit 470 further comprise first covering element 452, second covering element 462 and third covering element 474, respectively. Each of the first, second and third covering elements 452, 462, 474 are arranged on the first, second and third external cutting member 152, 162, 472, respectively. The first, second and third covering elements 452, 462, 474 each comprise a skin-contacting area arranged, in use, to contact skin. Each of the first, second and third covering elements 452, 462, 474 are further arranged centrally relative to the respective annular-shaped skin-contacting area of the first, second and third external cutting member 152, 162, 472, such that the skin-contacting areas of the external cutting members 152, 162, 472 surround a respective covering element 452, 462, 474. As illustrated in FIG. 4, each covering element 452, 462, 474 is disc-shaped, and thus a covering element which may also be referred to as a cap or a deco cap. Those skilled in the art will be aware of other suitable shapes and/or forms for the covering element.

The bi-polar RF generator unit 120 is configured to apply a first polarity RF voltage to the skin via the skin-contacting area provided by one of the external cutting members 152, 162, 472, for example the first external cutting member 152. Thus, the RF generator unit 120 is configured to apply the first polarity RF voltage to, for example, the external cutting member 152 of the first hair-cutting unit 150. The entirety of the external cutting member 152 conducts the first RF voltage, such that the first cutting member 152 is used as a first electrode for the RF signal. The bi-polar RF generator unit 120 is further configured to apply a second polarity RF voltage to the skin via another skin-contact area, for example, the skin-contacting area provided by the first covering element 452 arranged in the middle of the skin-contacting area of the first external cutting member 152. Thus, the RF generator unit 120 is configured to apply the second polarity RF voltage to, for example, the first covering element 452. The first covering element 452 may thus be used as a second electrode for the RF signal. Thus, for example, the first RF voltage can be provided to the skin via the first external cutting member 152, and the second RF voltage can be provided to the skin via the first covering element 452. The entirety of the covering element 452 may be configured to conduct the second polarity RF voltage.

Although not shown in FIG. 4, first external cutting member 152 and first covering element 452 are electrically isolated from each other in the cutting head 140/electric shaver 400 so that a 'circuit' for the RF voltages is only completed when the external cutting member 152 and the first covering element 452 are in contact with the skin. Electrical isolation can be achieved by an isolating material located between the first external cutting member 152 and first covering element 452, such as non-conducting plastic.

In use, the application of the cutting head 140 and, in particular, the skin-contacting areas of the first external cutting member 152 and first covering element 452 to skin, allows RF energy to be imparted into the skin to cause skin warming. RF energy may thus flow, for example, from the first external cutting member 152 to the first covering element 452 via the skin by the application of the first hair-cutting unit to the skin, and causes a heating effect in the skin.

In some examples, bi-polar RF generator unit 120 is further configured to apply the first polarity RF voltage to the skin via the skin-contacting area provided by an additional one of the external cutting members 152, 162, 472, for example, the second external cutting member 162. The entirety of the second external cutting member 162 may conduct the first RF voltage, such that the second external cutting member 162 is used as a third electrode for the RF signal. The bi-polar RF generator unit 120 is further configured to apply a second polarity RF voltage to another skin-contacting area, for example, second covering element 462 arranged in the middle of the skin-contacting area of the second external cutting member 162. The second covering element 462 may thus be used as a fourth electrode for the RF signal. The entirety of the second covering element 462 may be configured to conduct the second polarity RF voltage.

In a similar manner to the first external cutting member 152 and first covering element 452 described above, the second external cutting member 162 and the second covering element 462 are also electrically isolated from each other, such that, on application of the cutting head 140 to skin, RF energy may flow, for example from the second external cutting member 162 to the second covering element 462 to generate heating of the skin.

In some examples, bi-polar RF generator unit 120 is further configured to apply a first polarity RF voltage to the skin via the skin-contacting area provided by each of the external cutting members 152, 162, 472 and is further configured to apply a second polarity RF voltage to each of the covering elements 452, 462, 474. In such examples, the third external cutting member 472 and the third covering element 474 are also electrically isolated from each other in a similar manner to the first external cutting member 152 and first covering element 452, described above. An entirety of the third external cutting member 472 may be configured to conduct the first polarity RF voltage. The entirety of the third covering element 474 may be configured to conduct the second polarity RF voltage. Each of the external cutting members 152, 162, 472 and the covering elements 452, 462, 474 may thus be used as RF electrodes for the RF signal. Thus, in use, through the application of the cutting head 140 to skin, RF energy flows, for example, from the external cutting members 152, 162, 472 to the covering elements 452, 462, 474 through the skin, to generate a warming region in the skin.

RF energy may substantially flow between a respective pair of external cutting member 152, 162, 472 and covering element 452, 462, 474. For example, RF energy may substantially flow from the first hair-cutting unit 152 to the first covering element 452.

In an alternative approach to that described above, rather than connect the covering elements 452, 462, 474 to the bi-polar RF generator unit 120 to apply the second polarity RF voltage to the skin, at least one of the external cutting members 152, 162, 472 is used to apply the first polarity RF voltage to the skin, and another one of the external cutting members 152, 162, 472 is used to apply the second polarity RF voltage to the skin, thus completing a circuit and enabling the skin to be warmed. The use of the external cutting members 152, 162, 472 as the electrodes for the bi-polar RF generator unit 120 is therefore similar to the embodiments described above with respect to FIGS. 1 and 2.

Figure 5C:
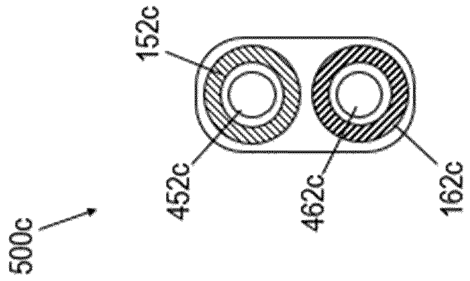
FIGS. 5A, 5B and 5C are illustrations of shaving cap arrangements on electric shavers.
Figure 5B:
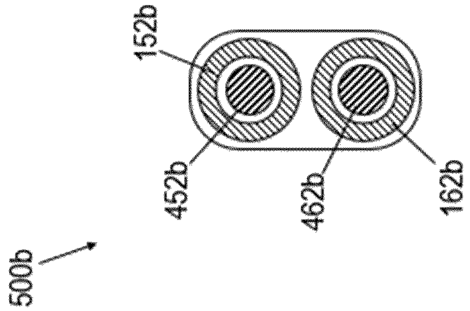
Figure 5A:
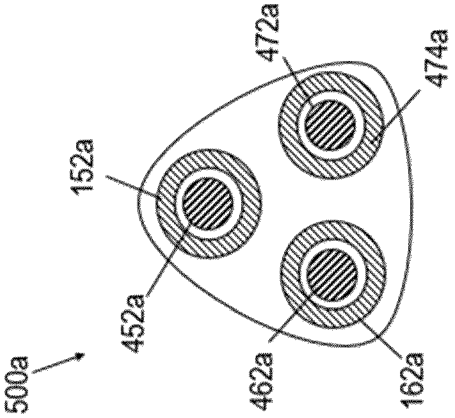

FIGS. 5A-C illustrate different external cutting member/covering element arrangements on rotary shavers 500*a*, 500*b*, 500*c*.

FIG. 5A illustrates an arrangement of a rotary shaver 500*a* comprising three hair-cutting units each comprising a respective external cutting member 152*a*, 162*a*, 472*a* and a respective covering element, 452*a*, 462*a*, 474*a*.

As described above with respect to FIG. 4, the external cutting members 152*a*, 162*a*, 472*a* are configured to conduct a first polarity RF voltage and the covering elements 452*a*, 462*a*, 474*a*, are configured to conduct a second polarity RF voltage. The external cutting members 152*a*, 162*a*, 472*a* and the covering elements, 452*a*, 462*a*, 474*a* are electrically isolated from each other, when not in contact with skin. As such, when applied to skin, an electric field is generated between the external cutting members 152*a*, 162*a*, 472*a* and the covering elements, 452*a*, 462*a*, 474*a*, such that RF energy flows, for example, from the external cutting members 152*a*, 162*a*, 472*a* to the respective covering elements, 452*a*, 462*a*, 474*a*.

FIG. 5B illustrates another arrangement of a rotary shaver 500*b* comprising two hair-cutting units. A first hair-cutting unit comprises a first external cutting member 152*b* and a second hair-cutting unit comprises second external cutting member 452*b*. First hair-cutting unit further comprises first covering element 452*b* arranged on the first external cutting member 152*b* and positioned in the middle of the skin-contacting area of the first external cutting member 152*b*. Second hair-cutting unit further comprises a second covering element 462*b* arranged on the second external cutting member 162*b* and positioned in the middle of the skin-contacting area of the second external cutting member 162*b*. Each external cutting member 152*a*, 162*a* is configured to conduct a first polarity RF voltage and each covering element 452*b*, 462*b* is configured to conduct a second polarity RF voltage. The external cutting members 152*b*, 162*b* and the covering elements, 452*b*, 462*b* are electrically isolated from each other, when not in contact with skin. Thus, in a similar manner to that described above, by the application of the shaver 500*b* to skin, an electric field is generated in the skin between the external cutting members 152*b*, 162*b* and the covering elements 452*b*, 462, such that RF energy flows between the external cutting members 152*b*, 162*b* and the covering elements 452*b*, 462, thus warming a region of the skin.

FIG. 5C relates to the alternative approach described above in which only the external cutting members are used as the electrodes for the bi-polar RF generator unit 120. Thus FIG. 5C illustrates another arrangement of a rotary shaver 500*c* comprising two hair-cutting units. In a similar manner to shaver 500*b*, a first hair-cutting unit comprises a first external cutting member 152*c* and a first covering element 452*c*, and second hair-cutting unit comprises second external cutting member 162*c* and second covering element 462*c*. First external cutting member 152*c* is configured to conduct a first polarity RF voltage and second external cutting member 162*c* is configured to conduct a second polarity RF voltage. In the shaver 500*c*, neither of first covering element 452*c* and second covering element 462*c* are connected to the bi-polar RF generator unit 120 and so do not themselves provide an RF voltage to the skin. In this embodiment the first covering element 452*c* and the second covering element 462*c* are for example made from an electrically non-conductive material such as plastic. The first external cutting member 152*c* and the second external cutting member 162*c* are electrically isolated from each other, when not in contact with skin. On application of shaver 500*c* to skin, an electric field is thus generated in the skin between the first external cutting member 152*c* and the second external cutting member 162*c*, such that RF energy flows from, for example the first hair-cutting unit 550*c* to the second hair-cutting unit 560*c*, to warm a region of the skin. Alternatively, the first covering element 452*c* may be electrically conductive and may be connected to the first external cutting member 152*c* to conduct the first polarity RF voltage together with the first external cutting member 152*c*. Likewise, the second covering element 462*c* may be electrically conductive and may be connected to the second external cutting member 162*c* to conduct the second polarity RF voltage together with the second external cutting member 162*c*.

Figure 6B:
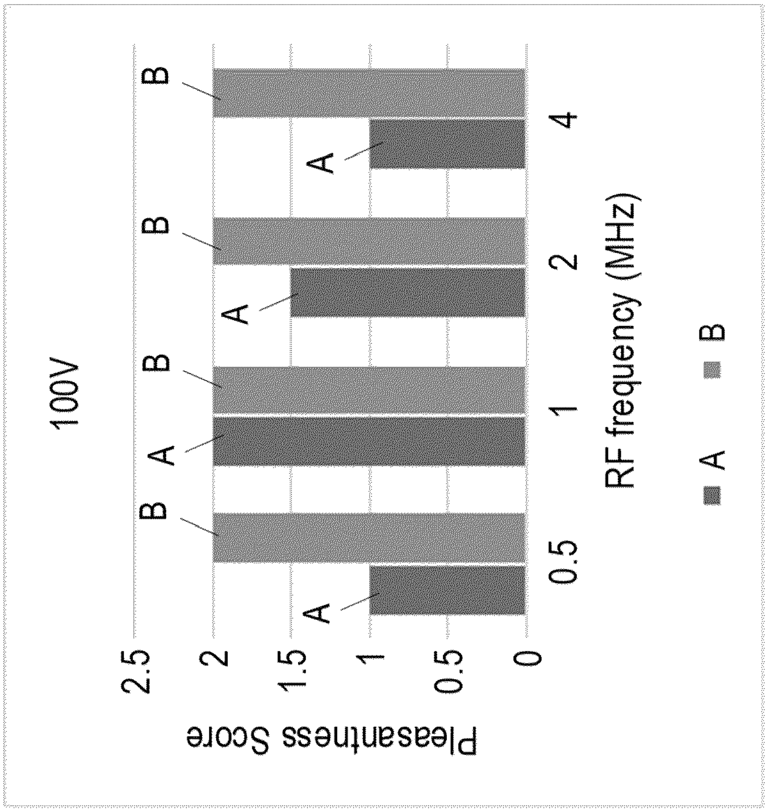
FIGS. 6A and 6B are results of pleasantness scores obtained using an electric shaver using RF energy to provide warming to the skin.
Figure 6A:
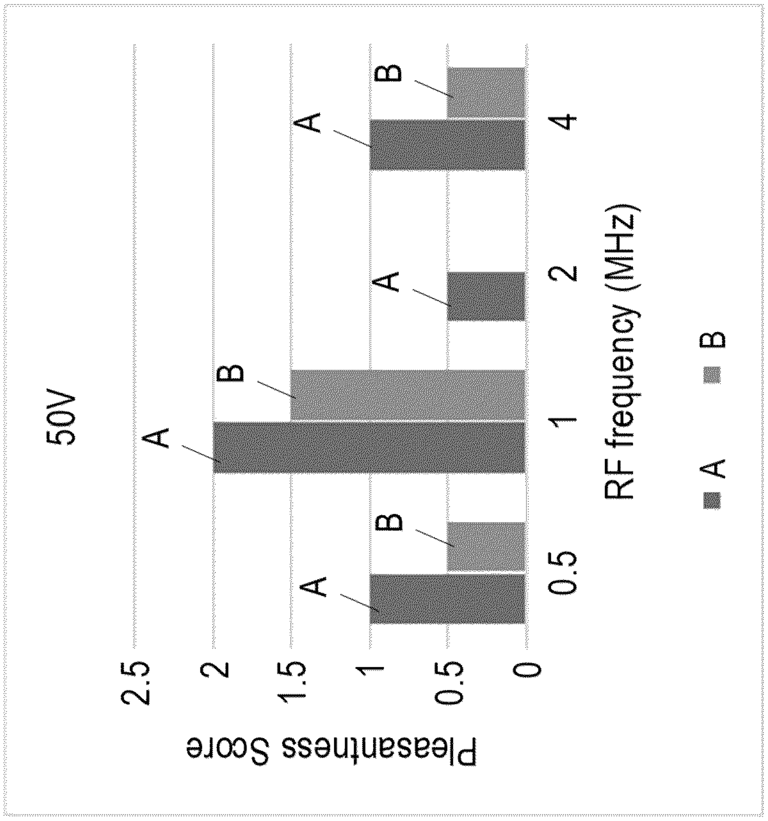

FIGS. 6A and 6B illustrate results of pleasantness scores obtained using an electric shaver according to examples of the present disclosure. The pleasantness scores were provided by different users who were using a foil-type shaver, such as that illustrated in FIG. 2 above and compared to pleasantness scores provided by the same users who were using a known skin-tightening device, which also applies RF energy to skin to warm the skin to promote skin tightening. Users of the devices were asked to score the perceived pleasantness of the skin warming from each device with "2" being pleasant, "1" being mild warmth and "0" being no to negligible warmth. The pleasantness scores 'A' relate to the foil shaver and the pleasantness scores 'B' relate to the skin-tightening device. The RF voltages in each device were modulated with a 10 Hz PWM signal having an 80% duty cycle with different RF frequencies and RF voltages. In these tests, a shaving gel had also been applied to the skin prior to use of the devices. The shaving gel used had an electrical conductivity the range from 0.01 to 0.25 S/m for an RF energy frequency of 1 MHz.

FIG. 6A illustrates the results obtained with a peak-to-peak voltage of 50V for bi-polar RF voltages applied with the frequencies of 0.5 MHz, 1 MHz, 2 MHz and 4 MHz. As illustrated, at this voltage level, the foil-type shaver outscored the skin-tightening device across all frequencies, with the most pleasant score being obtained for the 50V peak-to-peak voltage at a frequency of 1 MHz. FIG. 6B illustrates the results obtained with a peak-to-peak voltage of 100V for bi-polar RF voltages applied with the frequencies of 0.5 MHZ, 1 MHZ, 2 MHz and 4 MHz. As illustrated, the foil-type shaver was able to induce at least mild warming across all frequencies, with the highest pleasantness score again being obtained at the frequency of 1 MHz.

Examples according to the present disclosure thus present an electric shaver that is able to impart a pleasant warming sensation to skin through the application of RF energy to the skin. RF voltages are applied to the skin via at least one of the hair-cutting units of the electric shaver where the entirety of an external cutting member of a hair-cutting unit is configured to conduct the RF voltage. The external cutting member may occupy a relatively large portion of the skin-contacting area of the electric shaver, in use. As such, an electric field can be generated between the external cutting member and the other electrode (e.g. a cap associated with the hair-cutting unit or an external cutting member of another hair-cutting unit) through a relatively large area of the skin. Therefore, the flow of RF energy due to the electric field imparts warming to the skin over a relatively large area, thus invoking a pleasant warming sensation. The RF warming of the skin may further increase skin blood microcirculation in the skin and improve skin hydration. Furthermore, the RF warming may also enhance topical absorption.

Variations to the disclosed embodiments can be understood and effected by those skilled in the art in practicing the principles and techniques described herein, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. An electric shaver comprising:

a first hair-cutting unit comprising:

a first internal cutting member; and a first external cutting member arranged to cover the first internal cutting member, wherein the first internal cutting member is movable relative to the first external cutting member, wherein the first external cutting member comprises a first skin-contacting area comprising a first plurality of hair-entry openings, wherein the first skin-contacting area is arranged to contact skin during shaving;

a second skin-contacting area arranged to contact the skin during the shaving; and a bi-polar radio frequency (RF) generator unit configured to apply a first polarity RF voltage to the first external cutting member for inducing a warming sensation across an area of the skin, and wherein an entirety of the first external cutting member is configured to conduct the first polarity RF voltage; and wherein the bi-polar RF generator unit is further configured to apply a second polarity RF voltage to the second skin-contacting area; a second hair-cutting unit comprising: a second internal cutting member; and a second external cutting member arranged to cover the second internal cutting member, wherein the second internal cutting member is movable relative to the second external cutting member wherein the second external cutting member comprises the second skin-contacting area.

2. The electric shaver according to claim 1, wherein a second plurality of hair-entry openings provided in the second skin-contacting area, and wherein an entirety of the second external cutting member is configured to conduct the second polarity RF voltage.

3. The electric shaver according to claim 2, further comprising a third hair-cutting unit comprising:

a third internal cutting member;

a third external cutting member arranged to cover the third internal cutting member, wherein the third internal cutting member is movable relative to the third external cutting member, and wherein the third external cutting member comprises a third skin-contacting area comprising a third plurality of hair-entry openings; and wherein the bi-polar RF generator unit is configured to apply the first polarity voltage to the third external cutting member, and wherein an entirety of the third external cutting member is configured to conduct the first polarity RF voltage.

4. The electric shaver according to claim 3, wherein the second hair-cutting unit is arranged between the first hair-cutting unit and the third hair-cutting unit.

5. The electric shaver according to claim 2, wherein the first external cutting member and the second external cutting member each comprise a shaving foil extending parallel to a longitudinal direction; and the first internal cutting member and the second internal cutting member are configured to linearly reciprocate parallel to the longitudinal direction relative to the first external cutting member and the second external cutting member, respectively.

6. The electric shaver according to claim 3, wherein the third external cutting member comprises a shaving foil extending parallel to the longitudinal direction, and the third internal cutting member is configured to linearly reciprocate parallel to the longitudinal direction relative to the third external cutting member.

7. The electric shaver according to claim 2, wherein the first skin-contacting area is annular shaped, wherein the first internal cutting member is rotatable relative to the first external cutting member; and wherein the second skin-contacting area is annular shaped, wherein the second internal cutting member is rotatable relative to the second external cutting member.

8. The electric shaver according to claim 1, wherein the first and second polarity RF voltages have a frequency in a range from 0.5 MHz to 4 MHz.

9. The electric shaver according to claim 1, wherein the first polarity RF voltage and the second polarity RF voltage comprise a peak-to-peak voltage in a range from 10 Volts to 100 Volts.

10. An electric shaver, comprising:

a first hair-cutting unit comprising:

a first internal cutting member; and a first external cutting member arranged to cover the first internal cutting member, wherein the first internal cutting member is movable relative to the first external cutting member, wherein the first external cutting member comprises a first skin-contacting area comprising a first plurality of hair-entry openings, wherein the first skin-contacting area is arranged to contact skin during shaving, wherein the first skin-contacting area is annular shaped, and wherein the first internal cutting member is rotatable relative to the first external cutting member; and a first covering element that comprises a second skin-contacting area arranged to contact the skin during the shaving, wherein the first covering element is arranged on the first external cutting member in a central position relative to the first skin-contacting area such that the first skin-contacting area surrounds the second skin-contacting area, and wherein the first covering element is electrically isolated from the first external cutting member; and a bi-polar radio frequency (RF) generator unit configured to apply a first polarity RF voltage to the first external cutting member, wherein an entirety of the first external cutting member is configured to conduct the first polarity RF voltage, and wherein the bi-polar RF generator unit is further configured to apply a second polarity RF voltage to the second skin-contacting area.

11. The electric shaver according to claim 10, wherein the first covering element is disc-shaped.

12. The electric shaver according to claim 10, wherein an entirety of the first covering element is configured to conduct the second polarity RF voltage.

13. The electric shaver according to claim 10, further comprising a second hair-cutting unit, wherein the second hair-cutting unit comprises a second internal cutting member and a second external cutting member arranged to cover the second internal cutting member, and wherein the second internal cutting member is rotatable relative to the second external cutting member;

wherein the second external cutting member comprises an annular shaped third skin-contacting area comprising a second plurality of hair-entry openings, wherein the third skin-contacting area is arranged to contact the skin during the shaving; and wherein the second hair-cutting unit further comprises a second covering element that comprises a fourth skin-contacting area arranged to contact the skin during the shaving, and wherein the second covering element is arranged on the second external cutting member in a central position relative to the third skin-contacting area such that the third skin-contacting area surrounds the fourth skin-contacting area, wherein the second covering element is electrically isolated from the second external cutting member; and wherein the bi-polar RF generator unit is configured to apply the first polarity RF voltage to the second external cutting member, and wherein an entirety of the second external cutting member is configured to conduct the first polarity RF voltage; and wherein the bi-polar RF generator unit is further configured to apply the second polarity RF voltage to the fourth skin-contacting area.

14. The electric shaver according to claim 13, wherein the second covering element is disc shaped.

15. The electric shaver according to claim 13, wherein an entirety of the second covering element is configured to conduct the second polarity RF voltage.

16. The electric shaver according to claim 10, wherein the first and second polarity RF voltages have a frequency in a range from 0.5 MHz to 4 MHz.

17. The electric shaver according to claim 10, wherein the first polarity RF voltage and the second polarity RF voltage comprise a peak-to-peak voltage in a range from 10 Volts to 100 Volts.

* * * * *